United States Patent
Yamaguchi et al.

(10) Patent No.: US 9,156,508 B2
(45) Date of Patent: Oct. 13, 2015

(54) VEHICLE REAR SPOILER DEVICE

(71) Applicant: AISIN SEIKI KABUSHIKI KAISHA, Kariya-shi, Aichi (JP)

(72) Inventors: Wataru Yamaguchi, Aichi (JP); Yukihide Shibutani, Nagoya (JP); Mamoru Morita, Anjo (JP)

(73) Assignee: Aisin Seiki Kabushiki Kaisha, Kariya-shi, Aichi (JP)

( * ) Notice: Subject to any disclaimer, the term of this patent is extended or adjusted under 35 U.S.C. 154(b) by 0 days.

(21) Appl. No.: 14/368,750

(22) PCT Filed: Dec. 21, 2012

(86) PCT No.: PCT/JP2012/083293
§ 371 (c)(1),
(2) Date: Jun. 25, 2014

(87) PCT Pub. No.: WO2013/099809
PCT Pub. Date: Jul. 4, 2013

(65) Prior Publication Data
US 2015/0008699 A1 Jan. 8, 2015

(30) Foreign Application Priority Data

Dec. 26, 2011 (JP) ................ 2011-284560
Jul. 5, 2012 (JP) ................ 2012-151444

(51) Int. Cl.
*B62D 35/00* (2006.01)
*B62D 37/02* (2006.01)
(52) U.S. Cl.
CPC .............. *B62D 35/007* (2013.01); *B62D 37/02* (2013.01)

(58) Field of Classification Search
CPC ..................................... B62D 35/007
USPC ........................................ 296/91
See application file for complete search history.

(56) References Cited

U.S. PATENT DOCUMENTS

| 3,097,882 | A | * | 7/1963 | Andrews | .......................... 296/91 |
| 4,881,772 | A | * | 11/1989 | Feinberg | ..................... 296/180.1 |
| 6,273,488 | B1 | * | 8/2001 | Pike et al. | ......................... 296/91 |

FOREIGN PATENT DOCUMENTS

| GB | 2 148 210 | 5/1985 |
| JP | 60-37465 | 3/1985 |
| JP | 9-2339 | 1/1997 |
| JP | 10-45046 | 2/1998 |
| JP | 2001-180537 | 7/2001 |

(Continued)

OTHER PUBLICATIONS

Office Action for Japanese Appl. No. 2011-284560 dated Nov. 25, 2014.

*Primary Examiner* — Dennis H Pedder
(74) *Attorney, Agent, or Firm* — Finnegan, Henderson, Farabow, Garrett & Dunner, LLP (57) ABSTRACT

Provided is a vehicle rear spoiler device to be mounted on a rear side of a roof of a vehicle. The vehicle rear spoiler device includes a wall surface for forming an air flow path between the wall surface and a rear window glass of the vehicle. A part of an air current moving rearward along a roof surface of the roof during traveling is caused to pass through the air flow path as a downward current toward the rear window glass. The wall surface is formed to gradually widen the air flow path in a manner that an outflow width of an outlet on the rear window glass side in the air flow path is larger than an inflow width of an inlet on the roof side in the air flow path.

9 Claims, 9 Drawing Sheets

(56) References Cited

FOREIGN PATENT DOCUMENTS

| JP | 2002-2553 | 1/2002 |
| JP | 2002-103967 | 4/2002 |
| JP | 2002-274443 | 9/2002 |
| JP | 2009-286158 | 12/2009 |
| JP | 2010-179829 | 8/2010 |
| WO | WO2007/045056 | * 4/2007 |

* cited by examiner

VEHICLE REAR SPOILER DEVICE

CROSS-REFERENCE TO RELATED APPLICATIONS

This application is a national phase application of International Application No. PCT/JP2012/083293, filed Dec. 21, 2012, and claims the priority of Japanese Application Nos. 2011-284560, filed Dec. 26, 2011, and 2012-151444, filed Jul. 5, 2012, the content of all of which are incorporated herein by reference.

TECHNICAL FIELD

The present invention relates to a vehicle rear spoiler device, and more particularly, to a rear spoiler device having a function to prevent water droplets and the like from adhering to a rear window glass.

BACKGROUND ART

Hitherto, various types of vehicle rear spoiler devices have been proposed. For example, Patent Literature 1 discloses a vehicle rear spoiler device configured to form an air flow path having an outflow width smaller than an inflow width between the vehicle rear spoiler device and a rear window glass provided in a rear section of a vehicle. With this, a width of the air flow path between the vehicle rear spoiler device and the rear window glass is gradually reduced. As a result, an air current passes through the air flow path at higher speed (flow rate), and the air current at the higher flow rate is directed to the rear window glass in the rear section of the vehicle. Water droplets and the like adhering to the rear window glass are blown off by the air current at the higher flow rate, or the water droplets are suppressed from adhering thereto by an air-curtain effect. In this way, a cleaning effect of the rear window glass can be obtained (refer, for example, to Patent Literature 1).

CITATION LIST

Patent Literature

[PTL 1] JP 2002-2553A

SUMMARY OF INVENTION

Technical Problem

However, in the vehicle rear spoiler device disclosed in Patent Literature 1, the cleaning effect cannot be enhanced without increasing the flow rate of the air current, which may cause an increase in air resistance. Further, the air current at the higher flow rate is guided to an outside, and hence a higher negative pressure is generated on a vehicle rear surface. The higher negative pressure may intensify circulating air currents and swirling air currents from vehicle side surfaces, which may cause water droplets and the like to adhere to the rear window glass.

The present invention has been made in view of the above-mentioned problem, and it is therefore an object thereof to suppress an increase in air resistance and to reduce a negative pressure on a vehicle rear surface.

Solution to Problem

According to a first measure to achieve the object of the present invention, there is provided a vehicle rear spoiler device, including: a wall surface for forming an air flow path, through which a part of an air current moving rearward along a roof surface of a vehicle passes as a downward current, the air flow path being formed between the wall surface and a rear part of the vehicle; an outlet side edge portion formed on the wall surface correspondingly to an outlet of the air flow path; and an inlet side edge portion formed on the wall surface correspondingly to an inlet of the air flow path, in which an outflow width corresponding to a distance between the wall surface and the rear part of the vehicle at the outlet side edge portion is set to be larger than an inflow width corresponding to a distance between the wall surface and the rear part of the vehicle at the inlet side edge portion. In this case, it is preferred that the wall surface be formed to gradually widen the air flow path in a manner that the outflow width of the air flow path is larger than the inflow width of the air flow path.

Here, the description of "to gradually widen" means not only overall widening of the air flow path gradually from the inlet to the outlet, but also formation of the wall surface in a manner that a part of the air flow path becomes gradually wider. Further, the "rear part of the vehicle" generally refers to a rear section of a vehicle body, and the rear section of the vehicle body includes a rear window glass and a rear part of a roof.

With this configuration, in the vehicle rear spoiler device, a width of the air flow path formed between the vehicle rear spoiler device and the rear window glass (rear part of the vehicle) is gradually increased from the inlet toward the outlet so as to increase a negative pressure in the air flow path. Thus, air is more easily taken into the air flow path without causing an increase in air resistance, and hence a large amount of air taken in can be directed to the rear window glass. Therefore, a negative pressure on a vehicle rear surface can be reduced. As a result, adhesion of water droplets and the like, which may be caused by circulating air currents and swirling air currents from vehicle side surfaces, can be suppressed, and a greater cleaning effect can be obtained.

According to a second measure to achieve the object of the present invention, a ratio between the inflow width and the outflow width is set so as to generate a diffuser effect for the downward current in the air flow path.

With this configuration, the diffuser effect can be generated for the downward current in the air flow path, and hence a vehicle rear spoiler device that easily takes air therein and reduces the negative pressure on the vehicle rear surface can be provided.

According to a third measure to achieve the object of the present invention, the ratio between the inflow width and the outflow width is set substantially to 11:14.

With this setting, an air current, which can suppress increase in air resistance and reduce the negative pressure on the vehicle rear surface, can be more reliably formed in the air flow path.

According to a fourth measure to achieve the object of the present invention, the vehicle rear spoiler device further includes an upper surface for branching another part of the air current separately from the downward current, and moving the another part of the air current rearward, and the upper surface becomes gradually lower in height than the roof surface toward a rear of the vehicle.

With this configuration, the another part of the air current branched separately from the downward current flows toward the rear of the vehicle along the upper surface that becomes gradually lower in height than the roof surface. Then, the another part of the air current flows toward a bottom of the vehicle, and hence the negative pressure on the vehicle rear surface can be reduced.

Further, according to a fifth measure to achieve the object of the present invention, a guide portion is formed on the wall surface, the guide portion having a groove or a linear protrusion and inclining in a vehicle front-and-rear direction with respect to a vehicle width direction, and one end portion of the guide portion extends toward a vehicle rear edge of the wall surface.

With this configuration, the guide portion having the groove or the linear protrusion is formed on the wall surface of the vehicle rear spoiler device. Thus, when water droplets that enter the air flow path adhere to the wall surface of the vehicle rear spoiler device, the air current in the air flow path causes a part or all of the water droplets adhering thereto to move on the wall surface toward a vehicle rear side and to enter the guide portion. The water droplets that enter the guide portion flow on the wall surface along the guide portion in a manner of being guided by the guide portion. Here, the guide portion is inclined in the vehicle front-and-rear direction with respect to the vehicle width direction, and hence positions of the water droplets on the wall surface change in the vehicle width direction along with movement of the water droplets along the guide portion toward the vehicle rear side together with the air current in the air flow path. Then, the water droplets flow downward to fall from the one end portion of the guide portion. Further, when the guide portion extends up to the vehicle rear edge of the wall surface, the guide portion guides the water droplets finally to a position on the vehicle rear edge of the wall surface, at which the one end portion of the guide portion is formed. Then, the water droplets flow downward to fall therefrom, and adhere to the rear window glass.

In other words, with this configuration, the position at which the water droplets adhering to the wall surface of the vehicle rear spoiler device flow to fall can be adjusted depending on the position of the one end portion of the guide portion formed of the groove or the linear protrusion that is formed on the wall surface. Thus, even in a case where the water droplets flow into the air flow path, through adjustment of the position of the one end portion of the guide portion so that the water droplets fall onto a position at which the rearward field of vision through the rear window glass is not deteriorated, the rearward field of vision can be suppressed from being deteriorated by the water droplets that flow to fall onto the rear window glass.

It is preferred that the guide portion be inclined in the vehicle front-and-rear direction with respect to the vehicle width direction and also in a vehicle upper-and-lower direction with respect to the vehicle width direction. With this, the positions of the water droplets on the wall surface can be changed in the vehicle width direction along with downward movement of the water droplets along the guide portion due to the gravity or the air current in the air flow path. Further, it is preferred that the wall surface be inclined to the rear window glass provided in the rear section of the vehicle body. With this, the guide portion formed on the wall surface can be inclined in both the vehicle front-and-rear direction and the vehicle upper-and-lower direction with respect to the vehicle width direction.

It is preferred that the one end portion of the guide portion be positioned in the vehicle width direction so that the rearward field of vision is not deteriorated by water droplets that fall therefrom onto the rear window glass. For example, when the vehicle has a rear window wiper mounted thereto, it is preferred that the position in the vehicle width direction of the one end portion of the guide portion be set so that the water droplets flow to fall onto a region on an outside in the vehicle width direction of a wiping range of the rear window wiper for the rear window glass. In this case, it is preferred that the one end portion of the guide portion be positioned apart in the vehicle width direction by a predetermined distance from a central portion in the vehicle width direction of the wall surface of the vehicle rear spoiler device. It is further preferred that the position of the one end portion of the guide portion be spaced apart in the vehicle width direction by a length of 1/10 or more of a length in the vehicle width direction of the rear window glass from the central portion in the vehicle width direction of the wall surface so that behavior of a following vehicle traveling in the same lane can be recognized. With this, the water droplets that are guided along the guide portion and reach a vehicle rear edge portion of the wall surface fall onto a position spaced apart by a certain distance from a central portion in the vehicle width direction of the rear window glass. In other words, the water droplets flow to fall onto the rear window glass while avoiding the central portion in the vehicle width direction of the rear window glass. The rearward field of vision is deteriorated by the water droplets that adhere to the vicinity of the central portion of the rear window glass. Thus, when the water droplets flow to fall onto the rear window glass while avoiding the central portion in this way, the rearward field of vision can be suppressed from being deteriorated.

It is preferred that the guide portion be inclined in the vehicle front-and-rear direction with respect to the vehicle width direction in a manner that the guide portion is directed toward the outside from the central portion in the vehicle width direction along a direction toward the rear of the vehicle. With this, water droplets that enter the guide portion are separated from the central portion in the vehicle width direction of the wall surface toward the vehicle rear edge. Thus, at a time point when the water droplets reach the vehicle rear edge, positions of the water droplets are significantly separated from the central portion in the vehicle width direction. In this way, the water droplets fall onto the rear window glass from the position that is significantly spaced apart from the central portion, and hence the rearward field of vision can be more effectively suppressed from being deteriorated.

Another end portion of the guide portion may extend up to the vehicle rear edge of the wall surface, or may not extend up to the vehicle rear edge of the wall surface. Further, the guide portion may be formed into an inclined straight shape, or may be formed into an inclined curved shape. Still further, a plurality of guide portions may be formed on the wall surface of the vehicle rear spoiler device. In this case, it is preferred that the plurality of guide portions be formed to overlap with each other in the vehicle front-and-rear direction. Yet further, in a case where the guide portion is a groove or a linear protrusion, dimensions of the guide portion, such as a depth of the groove and a height of the linear protrusion, are not particularly limited as long as water droplets are guided along the guide portion.

Advantageous Effects of Invention

The present invention has been made in view of the above-mentioned problem, and it is therefore an object thereof to suppress an increase in air resistance and to reduce a negative pressure on a vehicle rear surface.

Description of Embodiments

First Embodiment

Now, detailed description is made of a first embodiment of the present invention with reference to the drawings.

Figure 1:
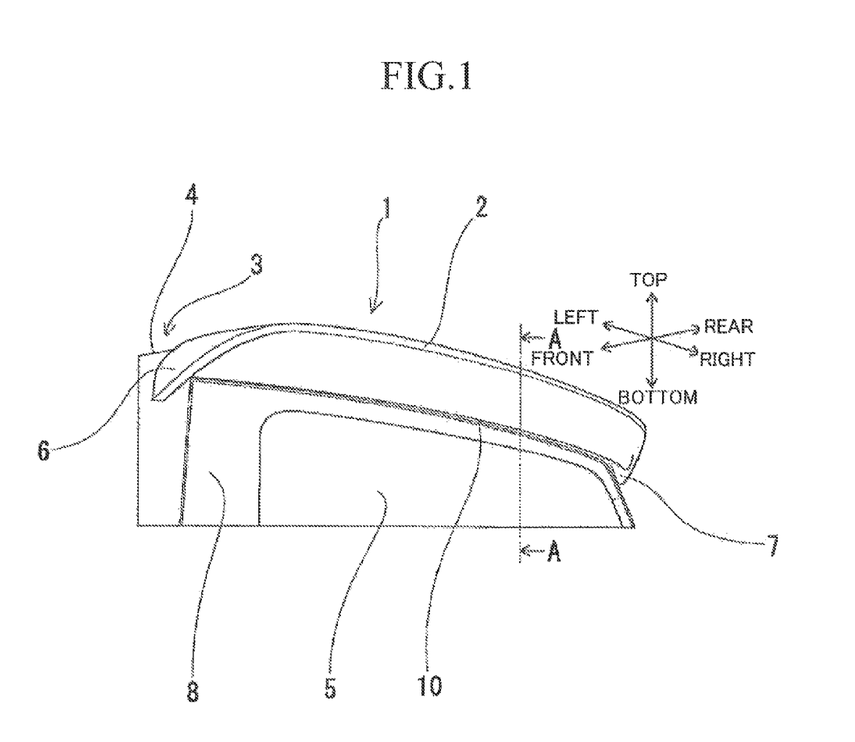
FIG. 1 is a perspective bottom view of a rear spoiler according to a first embodiment of the present invention.

FIG. 1 is a perspective bottom view of a rear spoiler device 1 (vehicle rear spoiler device) according to this embodiment. A rear spoiler 2 is arranged on a rear side of a roof 4 of a vehicle 3, and mounted to enhance running stability of the vehicle 3, improve fuel efficiency, and refine design of the vehicle 3. The rear spoiler 2 extends over a left-and-right direction (vehicle width direction) of the vehicle 3, and is provided with mounting pieces 6 and 7 at left and right end portions thereof in a manner of extending obliquely downward in a front direction. In addition, the rear spoiler 2 is mounted to an upper edge of a vehicle rear surface 8 through intermediation of the mounting pieces 6 and 7. Further, an air flow path 10 is formed between the rear spoiler 2 and a rear window glass 5 (rear part of the vehicle). The air flow path 10 is formed over the left-and-right direction of the vehicle 3. Note that, the air flow path 10 may be formed between the rear spoiler 2 and the upper edge (rear part of the vehicle) of the vehicle rear surface 8. Alternatively, the air flow path 10 may be formed over a left-and-right direction (vehicle width direction) of the rear window glass 5, or may be formed in a part of the left-and-right direction of the vehicle.

Figure 2:
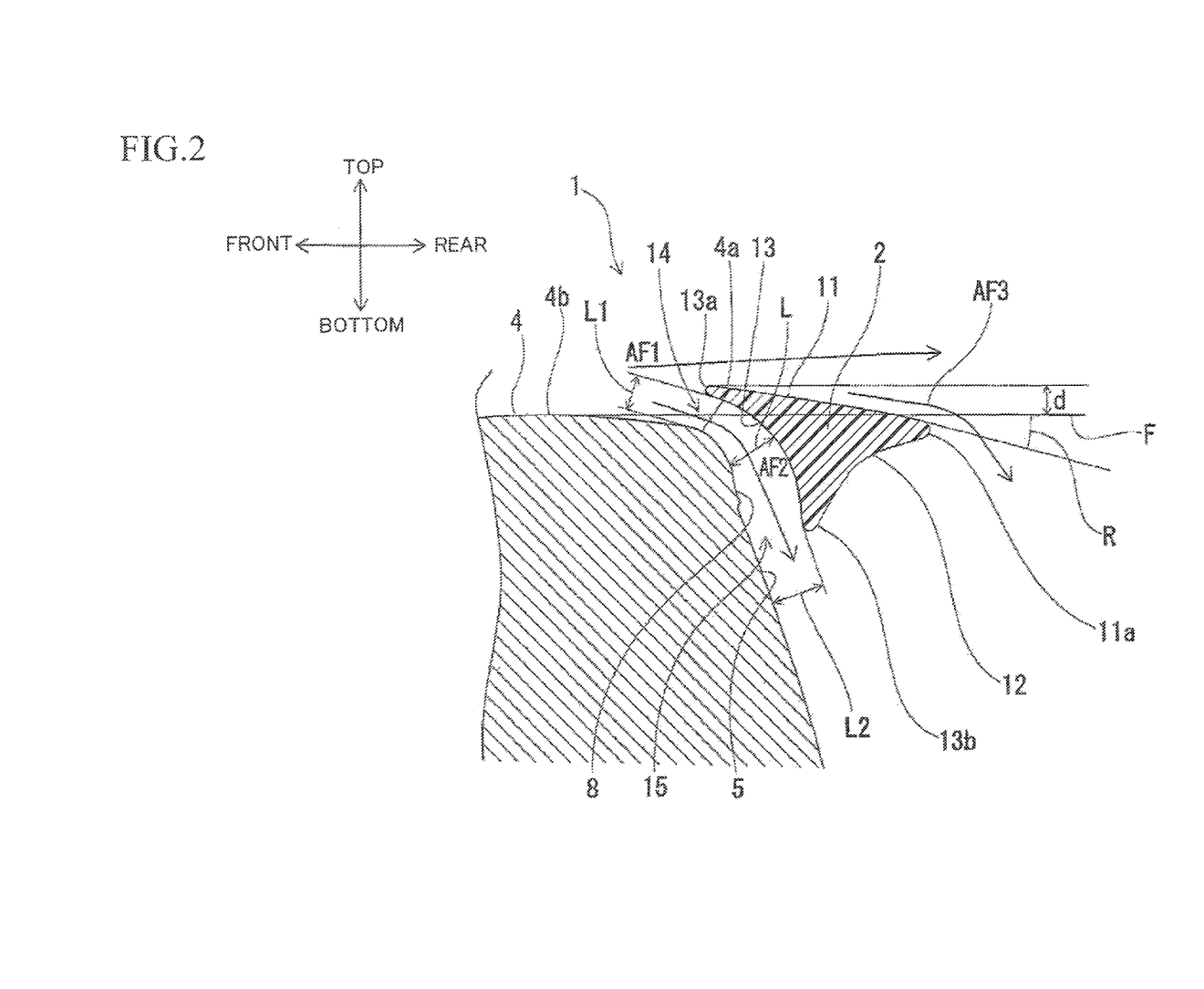
FIG. 2 is a sectional view take along the line A-A in FIG. 1, for illustrating a rear section of a vehicle body.

FIG. 2 is a sectional view taken along the line A-A in FIG. 1, for illustrating the vehicle 3 including the rear spoiler 2. As illustrated in FIG. 2, the rear spoiler 2 is formed of an upper wall portion 11, a lower wall portion 12, and an inner wall portion 13. Specifically, the inner wall portion 13 (wall surface) is provided to the rear spoiler 2 so as to form the air flow path 10 between the rear spoiler 2 and the rear window glass 5 of the vehicle 3. The inner wall portion 13 faces a rear end 4a of the roof 4, the vehicle rear surface 8, and the rear window glass 5, and extends downward along those portions from an upper edge 13a thereof. The upper edge 13a of the inner wall portion 13 is formed at a position higher than that of the roof 4 in an upper-and-lower direction, specifically, formed at a position spaced at a distance "d" from a reference plane F defined on an upper surface 4b (roof surface) of the roof 4. Further, the upper wall portion 11 (upper surface) is formed to extend obliquely downward toward a rear from the upper edge 13a of the inner wall portion 13. The upper wall portion 11 is formed to incline from a front edge part toward a rear edge part thereof in a downward fashion with respect to the reference plane F of the roof 4. The reference plane F and the upper wall portion 11 form an inclination angle R corresponding to an elevation angle of from 10° to 13°. Further, the lower wall portion 12 is formed to extend obliquely upward toward the rear from a lower edge 13b of the inner wall portion 13. Note that, the upper edge 13a of the inner wall portion 13 may be formed in the reference plane F at the same height as that of the upper surface 4b of the roof in the upper-and-lower direction.

The air flow path 10 is provided with an inflow port 14 (inlet) through which air flows in, and an outflow port 15 (outlet) through which the air flows out. The inflow port 14 is formed at a distance L1 (inflow width) between the upper edge (inlet side edge portion) 13a of the inner wall portion 13 and the rear end 4a of the roof 4. In other words, the inflow port 14 is formed on the roof 4 side in the air flow path 10. Further, the outflow port 15 is formed at a distance L2 (outflow width) between the lower edge (outlet side edge portion) 13b of the inner wall portion 13 and the rear window glass 5. Note that, the outflow port 15 may be formed between the lower edge 13b of the inner wall portion 13 and the vehicle rear surface 8. In other words, the outflow port 15 is formed on the rear window glass 5 side in the air flow path 10. Further, the inner wall portion 13 is provided to gradually widen the air flow path 10 in a manner that the distance L2 (outflow width) of the outflow port 15 is larger than the distance L1 (inflow width) of the inflow port 14. Specifically, the inner wall portion 13 extends in a manner that a distance L between the inner wall portion 13 and the rear end 4a of the roof 4 or the rear window glass 5 becomes gradually larger downward (rearward). Note that, the inner wall portion 13 may be partially formed into such a shape that the distance L is uniform downward (rearward) from the upper edge 13a.

Along with traveling of the vehicle 3, rearward air currents are generated around the vehicle 3. Simultaneously, an air current AF1 that moves rearward along the upper surface 4b of the roof 4 is formed on the roof 4. A part of the air current AF1 flows into the air flow path 10 through the inflow port 14, passes through the air flow path 10, and flows out as an air current AF2 (downward current) through the outflow port 15. In other words, the air current AF2 is a downward current toward the rear window glass 5 through the air flow path 10. Further, an air current AF3 that is branched from the air current AF1 at the upper wall portion 11 and moved to the rear of the vehicle 3 is formed separately from the air current AF2. Then, the air current AF3 flows along the upper wall portion 11, and then is diverted to a bottom side of the vehicle 3 behind a rear edge 11a of the upper wall portion 11.

Figure 3:
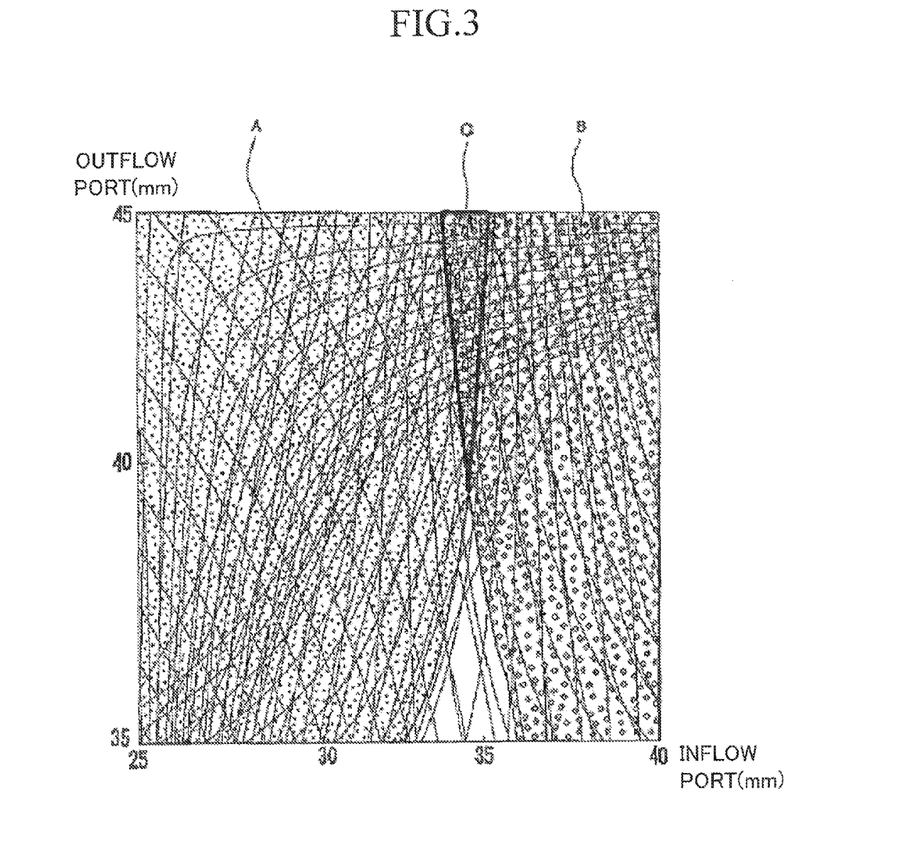
FIG. 3 is a graph showing a relationship between predetermined dimensions of an inflow port and an outflow port of an air flow path, a Cd value, and a vehicle speed ratio.

FIG. 3 shows a relationship between predetermined dimensions of the distance L1 of the inflow port 14 and the distance L2 of the outflow port 15 in the air flow path 10, a Cd value, and a vehicle speed ratio (ratio between a vehicle speed and a wind speed of the air current AF2). A range "A" represents a range of the distance L1 of the inflow port 14 and the distance L2 of the outflow port 15, in which the Cd value during traveling of the vehicle 3 tends to be small. Specifically, when the distance L1 is small, the distance "d" is small as well. Therefore, the inner wall portion 13 hits against the air current AF1 in a smaller area, with the result that air resistance (Cd value) is reduced. A range "B" represents a range of the distance L1 of the inflow port 14 and the distance L2 of the outflow port 15, and represents vehicle speed ratios at which the air current AF2 suppresses adhesion of water droplets to the rear window glass 5. In other words, the range "B" represents a range of the distance L1 of the inflow port 14 and the distance L2 of the outflow port 15, in which an air-curtain effect of blowing off, for example, the water droplets adhering to the rear window glass 5 with the air current AF2 is obtained. A range "C" represents a range in which the range "A" and the range "B" overlap with each other. In other words, the range "C" represents a range of the distance L1 of the inflow port 14 and the distance L2 of the outflow port 15, in which the Cd value is small and the adhesion of water droplets to the rear window glass 5 can be prevented. Further, in the area "C", it is desired that a ratio of the distance L1 and the distance L2 be set particularly to 11:14. Note that, the ratio of the distance L1 and the distance L2 need not be set strictly to 11:14 within the area "C".

Description is made of how the air currents are generated along with traveling of the vehicle 3.

The air currents illustrated in FIG. 2 include the air currents AF1, AF2, and AF3 that are generated around the vehicle 3 and in the rear spoiler device 1. The air current AF1 is generated above the upper surface 4b of the roof 4 and the upper wall portion 11 of the rear spoiler 2, and flows toward the rear of the vehicle 3 along the upper surface 4b of the roof 4 and the upper wall portion 11. The air current AF2 is branched as a part of the air current AF1, and flows into the air flow path 10 through the inflow port 14. Then, the air current AF2 passes through the air flow path 10, and flows out through the outflow port 15. After that, the air current AF2 flows downward along the rear window glass 5. The air current AF3 flows rearward along the upper wall portion 11 as a part of the air current AF1 that flows above the upper wall portion 11. The air current AF3 flows rearward and obliquely downward behind the rear edge 11a of the upper wall portion 11.

Further, the air flow path 10 is configured to gradually increase the distance L so that the air flow path 10 is widened gradually from the inflow port 14 toward the outflow port 15, and hence a diffuser effect is obtained. Thus, air pressure in the air flow path 10 becomes gradually higher, and hence the air current AF2 forcefully flows out through the outflow port 15. With this, the air current AF2 in the air flow path 10 flows more smoothly, and a negative pressure in the air flow path 10 becomes higher. As a result, a larger amount of air around the roof 4 and the rear spoiler 2 is taken into the air flow path 10 through the inflow port 14. In this way, a large amount of air is allowed to flow toward the rear of the vehicle along the rear window glass 5.

As described in detail above, according to this embodiment, the following advantages can be obtained.

(1) In the rear spoiler device 1, the distance L in the air flow path 10 formed between the rear spoiler 2 and the rear window glass 5 is gradually increased from the inflow port 14 toward the outflow port 15 so as to increase the negative pressure in the air flow path 10. With this, air is more easily taken into the air flow path 10 without causing an increase in air resistance, and hence a large amount of air thus taken in can be directed to the rear window glass 5. Thus, a negative pressure on the vehicle rear surface 8 can be reduced. As a result, adhesion of water droplets and the like, which may be caused by circulating wind and swirling wind from vehicle side surfaces, can be suppressed, and a greater cleaning effect can be obtained. Further, the negative pressures can be reduced, and hence pressure resistance applied to the vehicle 3 due to air can be reduced. With this, fuel efficiency of the vehicle can be enhanced as well.

(2) Due to generation of the diffuser effect for the air current AF2 in the air flow path 10, the rear spoiler device 1 that easily takes air therein and reduces the negative pressure on the vehicle rear surface 8 can be provided.

(3) The air current AF2, which can suppress increase in air resistance and reduce the negative pressure on the vehicle rear surface 8, can be more reliably formed in the air flow path 10.

(4) The air current AF3, which is branched separately from the air current AF2, flows toward the rear of the vehicle 3 along the upper wall portion 11 that becomes gradually lower than the upper surface 4b of the roof 4. With this, the air current AF3 flows toward the bottom of the vehicle 3, and a negative pressure behind the vehicle 3 can be reduced. As a result, a greater cleaning effect can be obtained.

(5) The air flow path 10 becomes gradually wider, and hence the air pressure in the air flow path 10 becomes gradually higher due to the diffuser effect. Thus, the air forcefully flows out through the outflow port 15 of the air flow path 10. With this, the air current AF2 in the air flow path 10 flows more smoothly, and the negative pressure becomes higher. As a result, the larger amount of air around the roof 4 and the rear spoiler 2 can be taken into the air flow path 10 through the inflow port 14. In other words, the distance "d" from the upper edge 13a of the inner wall portion 13 with respect to the reference plane F of the upper surface 4b of the roof 4 can be reduced, and air resistance to the vehicle 3 can be reduced.

Second Embodiment

Figure 4:
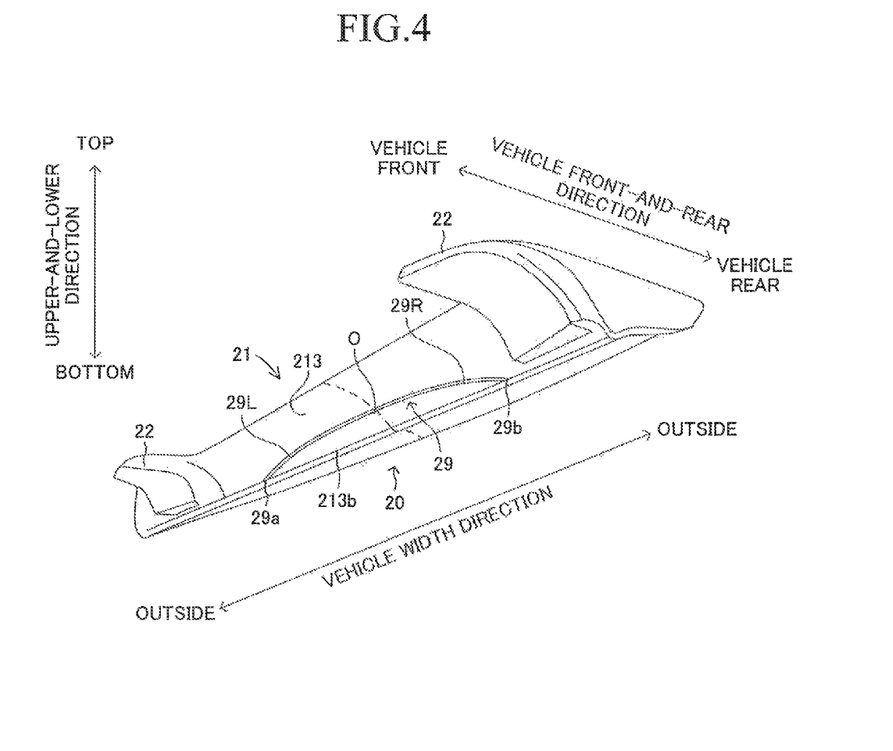
FIG. 4 is a schematic perspective view of a vehicle rear spoiler device according to a second embodiment.
Figure 5:
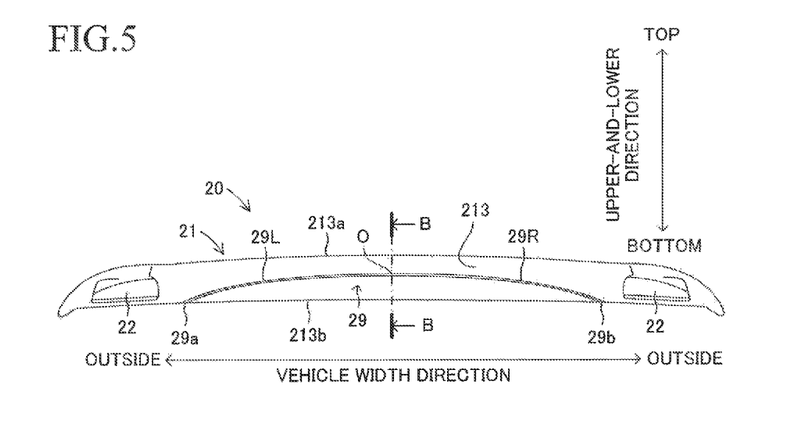
FIG. 5 is a front view of the rear spoiler device as viewed from a vehicle front side.
Figure 6:
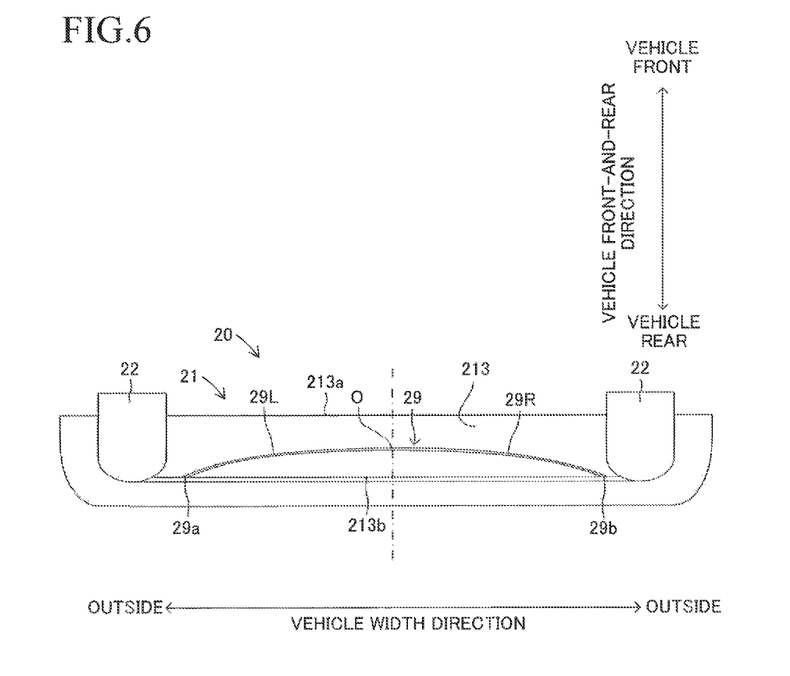
FIG. 6 is a bottom view of the rear spoiler device as viewed from a vehicle bottom side.
Figure 7:
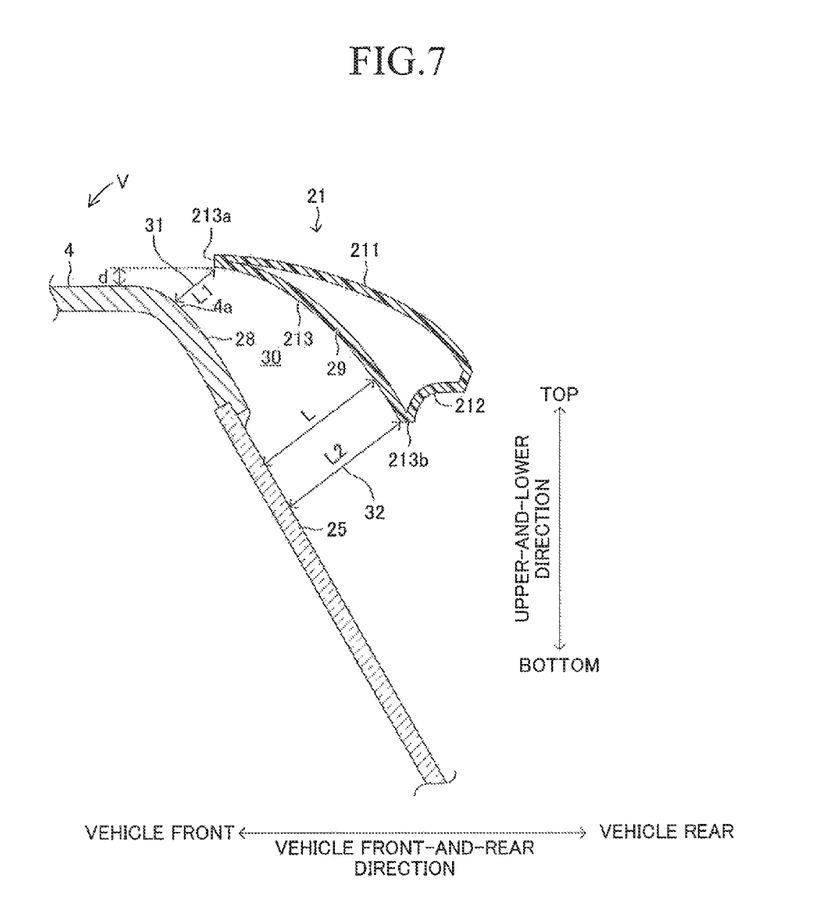
FIG. 7 is a schematic sectional view taken along the line B-B in FIG. 5, for illustrating a rear section of a vehicle body.

Next, description is made of a second embodiment of the present invention. FIG. 4 is a schematic perspective view of a rear spoiler device 20 according to the second embodiment of the present invention. FIG. 5 is a front view of the rear spoiler device 20. FIG. 6 is a bottom view of the rear spoiler device 20. Further, FIG. 7 is a sectional view taken along the line B-B in FIG. 5, for illustrating a rear section of a vehicle body. In addition, the directions indicated by arrows in FIGS. 4 to 7 correspond to directions with respect to a vehicle having the rear spoiler device 20 mounted thereto. As well as the rear spoiler device 1 according to the first embodiment, the rear spoiler device 20 according to this embodiment is mounted to the rear side of the roof of the vehicle. As illustrated in FIGS. 4 to 6, the rear spoiler device 20 includes a rear spoiler 21 and a pair of leg portions 22 and 22. The rear spoiler 21 is formed into an elongated shape. The leg portions 22 and 22 project from the vicinities of both longitudinal ends of the rear spoiler 21. The leg portions 22 and 22 include distal end portions fixed to the rear part of the vehicle body and an upper portion of a rear window glass. The state in which the rear spoiler device 20 is mounted to the vehicle is the same as that described in the first embodiment with reference to FIG. 1. The rear spoiler 21 is mounted to the vehicle over the vehicle width direction (left-and-right direction) in a manner of projecting to a vehicle rear side.

As illustrated in FIG. 7, an air flow path 30 is formed between the rear spoiler 21 and a rear window glass 25 (rear part of the vehicle). The air flow path 30 is formed over the vehicle width direction. Note that, the air flow path 30 may be formed between the rear spoiler 21 and a vehicle rear surface (rear part of the vehicle) 28. Alternatively, the air flow path 30 may be formed over the left-and-right direction (vehicle width direction) of the rear window glass 25, or may be formed in a part of the left-and-right direction of the vehicle.

The rear spoiler 21 includes an upper wall portion 211, a lower wall portion 212, and an inner wall portion (wall surface) 213. The air flow path 30 is formed between the inner wall portion 213 and the rear window glass 25 (or vehicle rear surface 28). As illustrated in FIG. 7, the inner wall portion 213 includes an upper edge (vehicle front edge) 213a and a lower edge (vehicle rear edge) 213b, and is formed into an elongated shape along the vehicle width direction. The upper edge 213a corresponds to the inlet side edge portion in the first embodiment described above, and the lower edge 213b corresponds to the outlet side edge portion in the first embodiment described above. The inner wall portion 213 is directed downward to face the rear end 4a of the roof 4, the vehicle rear surface 28, and the rear window glass 25 of a vehicle body V, and extends along those components downward and rearward from the upper edge (vehicle front edge) 213a to the lower edge (vehicle rear edge) 213b. The upper edge 213a of the inner wall portion 213 is formed at a position higher by the distance "d" than that of the upper surface of the roof 4 (roof surface). Further, the upper wall portion 211 is formed in a region of from the upper edge (vehicle front edge) 213a of the inner wall portion 213 toward the vehicle rear side, positioned above the inner wall portion 213, and is directed upward. The upper wall portion 211 is inclined downward from the upper edge (vehicle front edge) 213a of the inner wall portion 213 toward the rear of the vehicle. Further, the lower wall portion 212 is formed to extend from the lower edge (vehicle rear edge) 213b of the inner wall portion 213 toward the vehicle rear side. The lower wall portion 212 is formed to extend obliquely upward to the rear.

The air flow path 30 is provided with an inflow port 31 (inlet) for allowing a part of an air current, which moves rearward along the roof 4 (roof surface) during traveling of the vehicle, to flow into the air flow path 30, and an outflow port 32 (outlet) for allowing the air to flow out from the air flow path 30. The inflow port 31 is formed between the upper edge 213a of the inner wall portion 213 and the rear end 4a of the roof 4, that is, on the roof 4 side corresponding to an upper end side of the air flow path 30. The distance L1 in FIG. 7 represents a length of the inflow port 31 as viewed in the vehicle width direction (direction perpendicular to the drawing sheet of FIG. 7), specifically, a distance (inflow width) as viewed in the vehicle width direction between the upper edge 213a of the inner wall portion 213 and the rear end 4a of the roof 4. Further, the outflow port 32 is formed between the lower edge 213b of the inner wall portion 213 and the rear window glass 25, that is, on the rear window glass 25 side corresponding to a lower end side of the air flow path 30. The distance L2 in FIG. 7 represents a length of the outflow port 32 as viewed in the vehicle width direction, specifically, a shortest distance (outflow width) as viewed in the vehicle width direction between the lower edge 213b of the inner wall portion 213 and the rear window glass 25. Note that, the outflow port 32 may be formed between the lower edge 213b of the inner wall portion 213 and the vehicle rear surface 28.

Also in this embodiment, as in the first embodiment described above, the distance L2 (outflow width) of the outflow port 32 is larger than the distance L1 (inflow width) of the inflow port 31. Further, a flow path width (length L as viewed in the vehicle width direction) of the air flow path 30, that is, a flow path cross-sectional area is set to become gradually larger from the inflow port 31 side toward the outflow port 32 side. In other words, the inner wall portion 213 of the rear spoiler 21 is formed into such a shape that the distance L2 (outflow width) of the outflow port 32 is larger than the distance L1 (inflow width) of the inflow port 31, and that the flow path width (length L as viewed in the vehicle width direction) of the air flow path 30, that is, the flow path cross-sectional area becomes gradually larger from the inflow port 31 side toward the outflow port 32 side. Specifically, the inner wall portion 213 extends from the upper edge 213a thereof to the rear and the bottom of the vehicle in a manner that the distance L between the inner wall portion 213 and the vehicle rear surface 28 or the rear window glass 25 becomes gradually larger downward as viewed in the vehicle width direction.

Note that, the inner wall portion 213 may be partially formed into such a shape that the distance L is uniform.

Further, as illustrated in FIGS. 4 to 7, a groove (guide portion) 29 is formed on the inner wall portion 213. In this embodiment, as is clearly understood from FIGS. 5 and 6, the groove 29 is formed into a circular-arc shape that is convex to an upper side and the vehicle front side, and includes one end portion 29a and another end portion 29b each extending up to the lower edge (vehicle rear edge) 213b of the inner wall portion 213. Further, as illustrated in FIG. 7, the lower wall portion 212, which is formed in a region of from the lower edge (vehicle rear edge) 213b of the inner wall portion 213 to the vehicle rear side, is inclined upward toward the vehicle rear side. Thus, the lower edge (vehicle rear edge) 213b of the inner wall portion 213 is formed to project downward.

As illustrated in FIGS. 4 and 6, the groove 29 is inclined in a vehicle front-and-rear direction with respect to the vehicle width direction. Specifically, in the groove 29, a left groove portion 29L, which corresponds to a range of from a part O positioned at a central portion in the vehicle width direction of the inner wall portion 213 to the one end portion 29a, is inclined to a lower left side (vehicle rear side) with respect to the vehicle width direction in FIG. 6 in a manner that the left groove portion 29L is directed toward an outside from the central portion in the vehicle width direction along a direction of from the part O toward the vehicle rear side. Meanwhile, a right groove portion 29R, which corresponds to a range of from the part O to the another end portion 29b, is inclined to a lower right side (vehicle rear side) with respect to the vehicle width direction in FIG. 6 in a manner that the right groove portion 29R is directed toward the outside from the central portion in the vehicle width direction along the direction of from the part O toward the vehicle rear side.

Further, as illustrated in FIGS. 4 and 5, the groove 29 is inclined also in the upper-and-lower direction with respect to the vehicle width direction. Specifically, in the groove 29, the left groove portion 29L is inclined to the lower left side (bottom) with respect to the vehicle width direction in FIG. 5 in a manner that the left groove portion 29L is directed toward the outside from the central portion in the vehicle width direction along a direction of from the part O toward the vehicle bottom side. Meanwhile, the right groove portion 29R is inclined to the lower right side (bottom) with respect to the vehicle width direction in FIG. 5 in a manner that the right groove portion 29R is directed toward the outside from the central portion in the vehicle width direction along the direction of from the part O toward the vehicle bottom side.

Further, the one end portion 29a and the another end portion 29b of the groove 29 are positioned apart in the vehicle width direction by predetermined distances from the central portion in the vehicle width direction of the inner wall portion 213 of the rear spoiler 21. Specifically, the one end portion 29a is spaced apart from the central portion in the vehicle width direction of the inner wall portion 213 toward the left by a length of approximately ⅓ of an entire length of the rear spoiler 21 (length in the vehicle width direction) in FIGS. 5 and 6. Meanwhile, the another end portion 29b is spaced apart from the part O toward the right by the length of approximately ⅓ of the entire length of the rear spoiler 21 in FIGS. 5 and 6.

When a vehicle travels with the rear spoiler 21 having such a shape, air (traveling wind) flows into the air flow path 30 through the inflow port 31 between the rear spoiler 21 and the rear end of the roof 4. The air that flows into the air flow path 30 forms a downward current that flows along the rear window glass 25. This downward current prevents foreign matter from adhering to the rear window glass 25. Further, the air that flows into the air flow path 30 offsets eddies generated due to separation of an air current by the rear spoiler 21 during the traveling. Thus, pressure reduction along with generation of the eddies is suppressed in the rear section of the vehicle body, with the result that running resistance is reduced.

Further, the flow path width L (flow path area) of the air flow path 30 is configured to become gradually larger from the inflow port 31 toward the outflow port 32, and hence the air pressure in the air flow path 30 becomes gradually higher due to the diffuser effect. As a result, the air forcefully flows through the outflow port 32. Further, the air current in the air flow path 30 flows more smoothly, and a negative pressure in the air flow path 30 becomes higher. As a result, a larger amount of air around the roof 4 and the rear spoiler 21 is taken into the air flow path 30 through the inflow port 31. In this way, a large amount of air is allowed to flow toward the rear of the vehicle along the rear window glass 25. With this, a negative pressure on the vehicle rear surface 28 can be reduced, and adhesion of water droplets and the like to the rear window glass 25, which may be caused by circulating wind and swirling wind from vehicle side surfaces, can be suppressed. Thus, the rear window glass 25 can be more effectively cleaned. Further, the negative pressures can be reduced, and hence pressure resistance applied to the vehicle V due to air can be reduced. With this, fuel efficiency of the vehicle can be enhanced as well.

Further, when water droplets of rain and the like enter the air flow path 30 together with air during rainfall, the water droplets adhere to the inner wall portion 213 of the rear spoiler 21. The water droplets adhering to the inner wall portion 213 flow to fall from the lower edge (vehicle rear edge) 213b of the inner wall portion 213 onto the rear window glass 25. The air current flowing through the air flow path 30 blows off the water droplets adhering to the rear window glass 25, and hence many of the water droplets are removed. However, all the water droplets are difficult to remove. In this state, unremoved water droplets that flow to fall onto the vicinity of a center of the rear window glass 25 may block the rearward field of vision, which may deteriorate the rearward field of vision. In particular, during heavy rainfall, a large number of water droplets flow to fall from the rear spoiler 21 onto the rear window glass 25, and hence the rearward field of vision is significantly deteriorated. In view of this, the rear spoiler device 20 according to this embodiment is configured to prevent the rearward field of vision from being deteriorated by the water droplets that fall from the rear spoiler 21 onto the rear window glass 25.

In this embodiment, of the water droplets that flow into the air flow path 30 and adhere to the inner wall portion 213, water droplets that adhere to the vehicle front side with respect to the groove 29 are moved to the vehicle rear side due to a pressure of the air (traveling wind) that flows into the air flow path 30, and then enter the groove 29. The water droplets that enter the groove 29 flow along the groove 29. Rainwater that enters the left groove portion 29L in the groove 29 is moved to the rear of the vehicle due to the traveling wind, and along therewith, moved leftward in FIG. 6 along the left groove portion 29L from a part close to the center in the vehicle width direction toward the outside, to thereby reach the one end portion 29a. Meanwhile, rainwater that enters the right groove portion 29R is moved to the rear of the vehicle due to the traveling wind, and along therewith, moved rightward in FIG. 6 along the right groove portion 29R from the part close to the center in the vehicle width direction toward the outside, to thereby reach the another end portion 29b. The one end portion 29a and the another end portion 29b of the groove 29 are positioned on the lower edge (vehicle rear edge) 213b of the inner wall portion 213, and the lower edge (vehicle rear edge) 213b of the inner wall portion 213 is formed to project downward. Thus, the water droplets that reach those one end portion 29a and another end portion 29b fall downward therefrom.

As illustrated in FIG. 7, the rear window glass 25 is positioned below the rear spoiler 21. Thus, the water droplets from the one end portion 29a and the another end portion 29b of the groove 29 fall onto the rear window glass 25. In this embodiment, the one end portion 29a and the another end portion 29b of the groove 29 are each positioned significantly apart in the vehicle width direction from a central portion in the vehicle width direction of the rear spoiler 21. Specifically, the one end portion 29a and the another end portion 29b are positioned apart in the vehicle width direction from a central portion in the vehicle width direction of the rear spoiler 21 respectively toward the left and right by the length of approximately ⅓ of the entire length of the rear spoiler 21. Thus, the water droplets that fall from those end portions adhere to the vicinities of left and right end portions of the rear window glass 25, and hence do not fall onto the vicinity of a central portion of the rear window glass 25. Therefore, the rearward field of view is not deteriorated due to adhesion of the water droplets to the vicinity of the center of the rear window glass 25.

In this way, the rear spoiler device 20 according to this embodiment is mounted to an upper part of the rear window glass 25, which corresponds to a rear part of the roof 4 of the vehicle body V, so as to form the air flow path 30 in the rear section of the vehicle body V. The rear spoiler device 20 is formed to project to the vehicle rear side over the vehicle width direction, and includes a surface directed downward (inner wall portion 213). The air flow path 30 is formed between the inner wall portion 213 and the rear window glass 25. The inner wall portion 213 is formed so that the outflow width L2 of the outflow port 32 of the air flow path 30 is larger than the inflow width L1 of the inflow port 31 of the air flow path 30, and that the flow path cross-sectional area of the air flow path 30 becomes gradually larger from the inflow port 31 toward the outflow port 32. Further, the inner wall portion 213 is provided with the groove 29 (guide portion). This groove 29 is inclined in the vehicle front-and-rear direction with respect to the vehicle width direction, and the one end portion 29a thereof extends up to the lower edge (vehicle rear edge) 213b of the inner wall portion 213.

According to the rear spoiler device 20 of this embodiment, the distance L in the air flow path 30 formed between the rear spoiler 21 and the rear window glass 25 is gradually increased from the inflow port 31 toward the outflow port 32 so as to increase the negative pressure in the air flow path 30. With this, air is more easily taken into the air flow path 30 without causing an increase in air resistance, and hence a large amount of air thus taken in can be directed to the rear window glass 25. Thus, a negative pressure on the vehicle rear surface 28 can be reduced. As a result, adhesion of water droplets and the like, which may be caused by circulating wind and swirling wind from vehicle side surfaces, can be suppressed, and a greater cleaning effect can be obtained. Further, the negative pressures can be reduced, and hence pressure resistance applied to the vehicle due to air can be reduced. With this, fuel efficiency of the vehicle can be enhanced as well.

Further, according to this embodiment, even when water droplets adhere to the inner wall portion 213 of the rear spoiler 21, the position at which the water droplets adhering thereto flow to fall onto the rear window glass 25 can be adjusted depending on the position of the one end portion 29a of the groove 29 formed in the inner wall portion 213. Thus, when the position of the one end portion 29a of the groove 29 is adjusted so that the water droplets fall onto a position at which the rearward field of vision is not deteriorated, the rearward field of vision can be suppressed from being deteriorated by the water droplets that flow to fall from the rear spoiler 21 onto the rear window glass 25 during rainfall.

Further, the groove 29 is inclined in the vehicle front-and-rear direction with respect to the vehicle width direction in a manner that the groove 29 is directed toward the outside from the central portion in the vehicle width direction along a direction toward the vehicle rear side. In addition, the one end portion 29a and the another end portion 29b of the groove 29 are positioned apart in the vehicle width direction by the predetermined distances from the central portion in the vehicle width direction of the inner wall portion 213 of the rear spoiler 21. Thus, the water droplets that enter the groove 29 are separated from the central portion in the vehicle width direction of the inner wall portion 213 toward the vehicle rear edge 213b of the inner wall portion 213. Then, at a time point when the water droplets reach the lower edge (vehicle rear edge) 213b of the inner wall portion 213, positions of the water droplets are significantly separated from the central portion in the vehicle width direction of the inner wall portion 213. In this way, the water droplets fall onto the rear window glass 25 from the positions that are significantly spaced apart from the central portion of the rear spoiler 21, and hence the rearward field of vision can be more effectively suppressed from being deteriorated.

The second embodiment of the present invention is described above, but the present invention is not construed as being limited to the second embodiment. In the example described above in the second embodiment, the groove 29 is formed as the guide portion in the inner wall portion 213 of the rear spoiler 21. However, the guide portion may include a linear protrusion, and in this case, the linear protrusion guides water droplets to the lower edge (vehicle rear edge) 213b of the inner wall portion 213.

Figure 8:
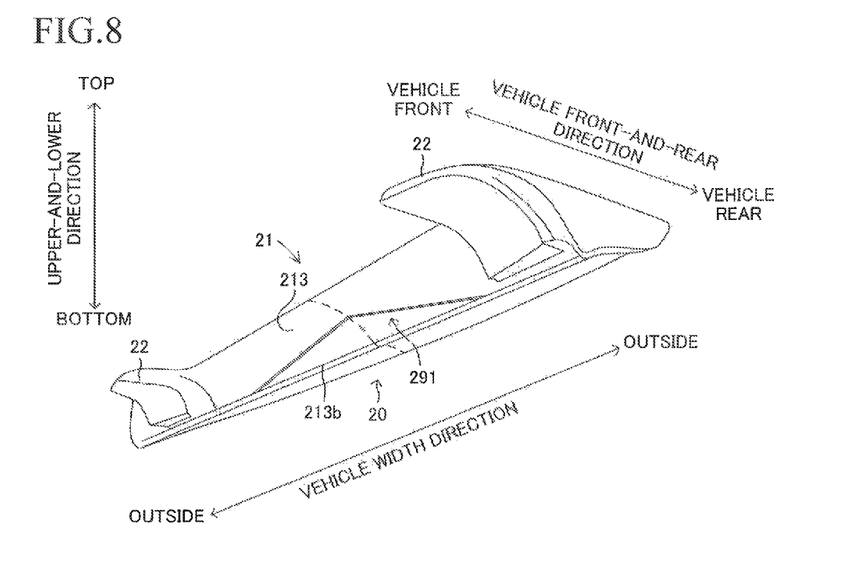
FIG. 8 is a view of a modification of a groove formed in an inner wall portion of the rear spoiler.
Figure 9:
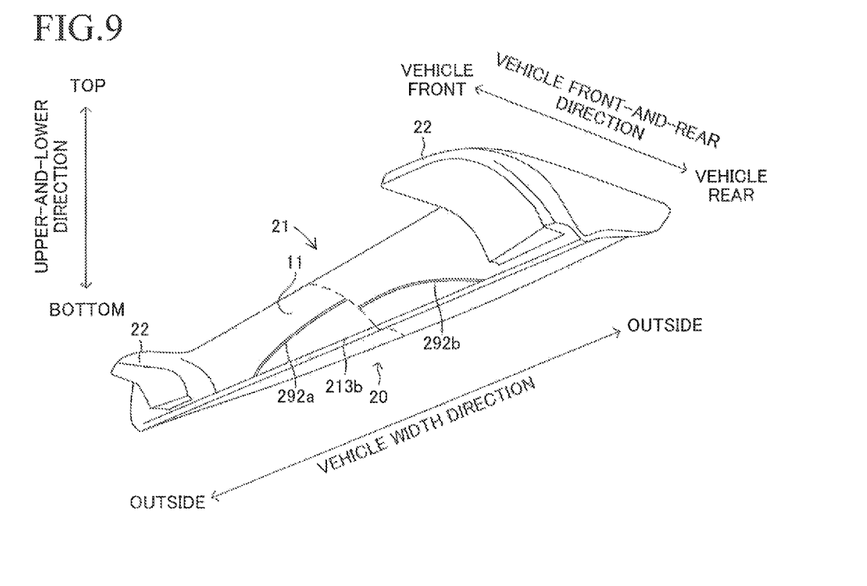
FIG. 9 is a view of another modification of the groove formed in the inner wall portion of the rear spoiler.

Further, in the example described above in the second embodiment, the groove 29, which has a circular-arc shape, is formed in the inner wall portion 213 of the rear spoiler 21. However, as illustrated in FIG. 8, straight grooves 291 (or linear protrusions) may be formed in the inner wall portion 213. Still further, both the end portions of the groove 29 described above in the second embodiment need not extend up to the lower edge (vehicle rear edge) 213b of the inner wall portion 213 as long as one of the end portions extends up to the lower edge (vehicle rear edge) 213b. For example, as illustrated in FIG. 9, the inner wall portion 213 may be provided with a first groove 292a and a second groove 292b each having one end portion that extends up to the lower edge (rear edge) 213b.

Figure 10:
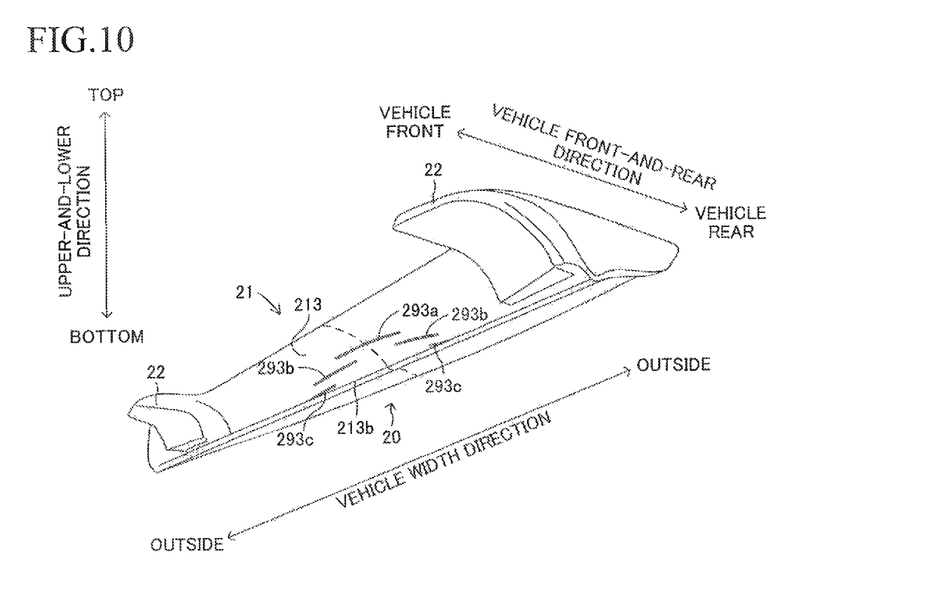
FIG. 10 is a view of still another modification of the groove formed in the inner wall portion of the rear spoiler.

Alternatively, as illustrated in FIG. 10, the inner wall portion 213 may be provided with a plurality of grooves (first groove 293a, second grooves 293b and 293b, and third grooves 293c and 293c). In this case, the third grooves 293c and 293c extending up to the lower edge (vehicle rear edge) 213b of the inner wall portion 213 each correspond to the guide portion of the present invention, and the first groove 293a and the second grooves 293b and 293b correspond to auxiliary grooves for allowing water droplets to enter the third grooves 293c and 293c. Further, in this case, it is preferred that both end portions of the first groove 293a overlap in the vehicle front-and-rear direction respectively with end portions of the second grooves 293b and 293b, and that other end portions of the second grooves 293b and 293b overlap in the vehicle front-and-rear direction respectively with end portions of the third grooves 293c and 293c. In addition, it is preferred that the grooves be each inclined in the vehicle front-and-rear direction with respect to the vehicle width direction in a manner that the grooves are each directed toward the outside from the central portion in the vehicle width direction along the direction toward the vehicle rear side. With this, water droplets that enter the first groove 293a are guided along the first groove 293a, and reach the end portions of the first groove 293a. Then, the water droplets overflow therefrom and move to the vehicle rear side so as to enter the second grooves 293b. The rainwater in the second grooves 293b is guided along the second grooves 293b, and reaches the end portions of the second grooves 293b. Then, the rainwater overflows therefrom and moves to the vehicle rear side so as to enter the third grooves 293c. The rainwater that enters the third grooves 293c is guided along the third grooves 293c, and reaches the end portions of the third grooves 293c. Then, the water droplets flow to fall onto the rear window glass 25.

Figure 11:
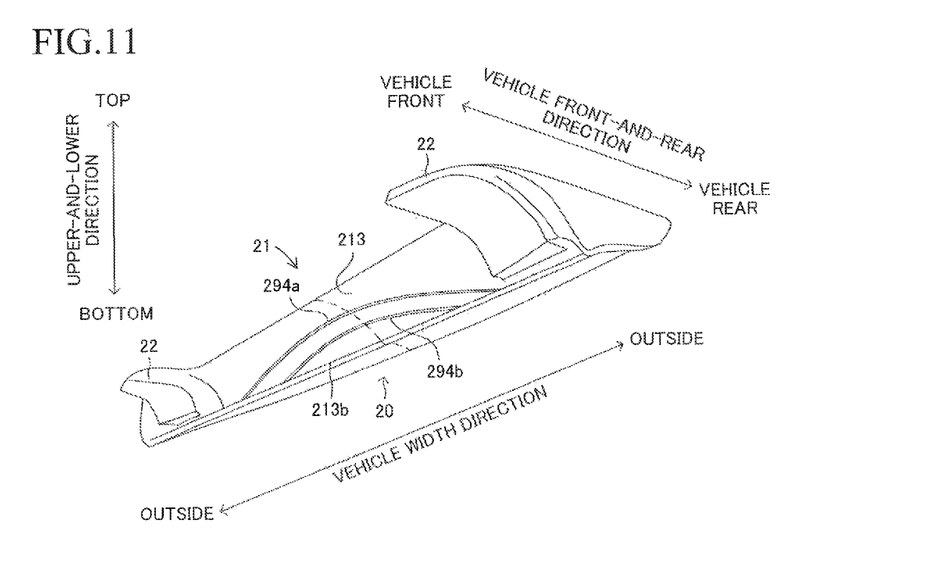
FIG. 11 is a view of yet another modification of the groove formed in the inner wall portion of the rear spoiler.
Figure 12:
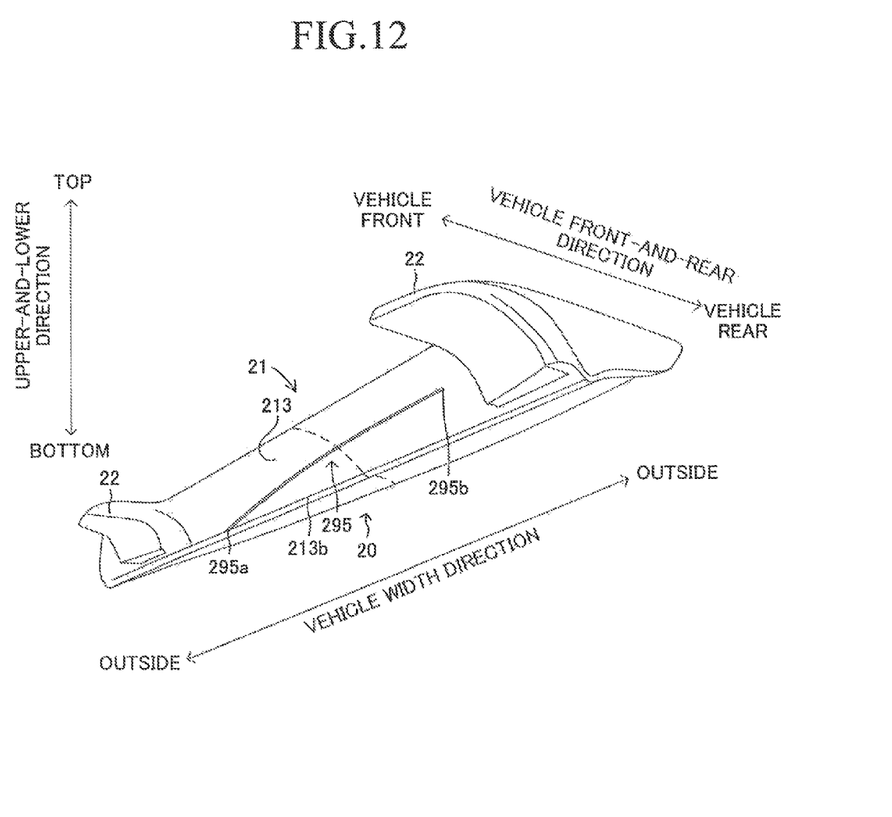
FIG. 12 is a view of yet another modification of the groove formed in the inner wall portion of the rear spoiler.

Still alternatively, as illustrated in FIG. 11, the inner wall portion 213 may be provided with a plurality of concentric grooves 294a and 294b. Yet alternatively, the grooves (or linear protrusions) provided on the inner wall portion 213 may be formed in line symmetry with respect to the central portion in the vehicle width direction of the inner wall portion, or formed in asymmetry with respect to the central portion. For example, as illustrated in FIG. 12, the inner wall portion 213 may be provided with a single groove 295 (or linear protrusion) having one end portion 295a that extends up to the lower edge (vehicle rear edge) 213b of the inner wall portion 213, and another end portion 295b that does not extend up to the lower edge (vehicle rear edge) 213b. Water droplets positioned at a part on the vehicle front side in the groove 295 move in the groove 295 in a manner that the water droplets come closer to the central portion in the vehicle width direction along the direction toward the vehicle rear side. Meanwhile, water droplets positioned at a part on the vehicle rear side in the groove 295 move in the groove 295 in a manner that the water droplets are separated from the central portion in the vehicle width direction along the direction toward the vehicle rear side. Then, all the water droplets that enter the groove 295 flow to fall onto the rear window glass from the one end portion 295a.

Further, in the example described above in the second embodiment, the one end portion 29a of the groove 29 is spaced apart from the central portion in the vehicle width direction of the inner wall portion 213 toward the left by the length of approximately ⅓ of the entire length of the rear spoiler 21 (length in the vehicle width direction) in FIG. 5. Meanwhile, the another end portion 29b is spaced apart from the central portion in the vehicle width direction of the inner wall portion 213 toward the right by the length of approximately ⅓ of the entire length of the rear spoiler 21 in FIG. 5. The position in the vehicle width direction of the one end portion of the groove 29 (guide portion) is not particularly limited as long as the position is spaced apart by a predetermined distance from the central portion in the vehicle width direction of the inner wall portion of the rear spoiler so that the rearward field of vision is not deteriorated by water droplets that fall from this position onto the rear window glass. In this case, the position of the one end portion of the groove 29 (guide portion) is not particularly limited as long as the position is spaced apart in the vehicle width direction by the length of ​1/10 or more of the length in the vehicle width direction of the rear window glass 25 from the central portion O in the vehicle width direction of the inner wall portion 213 of the rear spoiler 21. Even when water droplets fall onto the position that is spaced apart to this extent or more from the center in the vehicle width direction of the rear window glass 25, the rearward field of vision is not significantly deteriorated. Further, when the vehicle has a rear window wiper mounted thereto, it is preferred that the position in the vehicle width direction of the one end portion of the groove 29 (guide portion) be set so that water droplets flow to fall onto a region on an outside in the vehicle width direction of a wiping range of the rear window wiper for the rear window glass.

In this way, modifications may be made to the present invention without departing from the gist thereof.

Note that, the following technical thoughts can be understood from the details described above in the second embodiment.

(1) A vehicle rear spoiler device, including:
an inner wall portion being a downward surface, for forming an air flow path between the inner wall portion and a rear part of a vehicle; and
a guide portion formed in the inner wall portion to incline in a vehicle front-and-rear direction with respect to a vehicle width direction, the guide portion having a groove or a linear protrusion that extends toward a vehicle rear edge of the inner wall portion at one end portion thereof.

(2) A vehicle rear spoiler device according to Item (1), in which the guide portion extends up to the vehicle rear edge of the inner wall portion.

(3) A vehicle rear spoiler device according to Item (1) or (2), in which the one end portion of the guide portion is positioned apart in the vehicle width direction by a predetermined distance from a central portion in the vehicle width direction of the inner wall portion.

(4) A vehicle rear spoiler device according to any one of Items (1) to (3), in which the guide portion is inclined in the vehicle front-and-rear direction with respect to the vehicle width direction in a manner that the guide portion is directed toward an outside from the central portion in the vehicle width direction along a direction toward a rear of the vehicle.

(5) A vehicle rear spoiler device according to any one of Items (1) to (4), in which the guide portion includes another end portion that extends up to the vehicle rear edge of the inner wall portion.

The invention claimed is:

1. A vehicle rear spoiler device, comprising:
a wall surface for forming an air flow path, through which a part of an air current moving rearward along a roof surface of a vehicle passes as a downward current, the air flow path being formed between the wall surface and a rear part of the vehicle;
an outlet side edge portion formed on the wall surface correspondingly to an outlet of the air flow path; and
an inlet side edge portion formed on the wall surface correspondingly to an inlet of the air flow path,
wherein an outflow width corresponding to a distance between the wall surface and the rear part of the vehicle at the outlet side edge portion is set to be larger than an inflow width corresponding to a distance between the wall surface and the rear part of the vehicle at the inlet side edge portion, and
wherein a guide portion is formed on the wall surface, the guide portion having a groove or a linear protrusion diverging from a central portion toward an outside in the vehicle width direction, inclining to a lower side along a direction toward the outside in the vehicle width direction, and one end portion of the guide portion extends toward a vehicle rear edge of the wall surface.

2. A vehicle rear spoiler device according to claim 1, wherein a ratio between the inflow width and the outflow width is set so as to generate a diffuser effect for the downward current in the air flow path.

3. A vehicle rear spoiler device according to claim 2, wherein the ratio between the inflow width and the outflow width is set substantially to 11:14.

4. A vehicle rear spoiler device according to claim 3, further comprising an upper surface for branching another part of the air current separately from the downward current, and moving the another part of the air current rearward, wherein the upper surface becomes gradually lower in height than the roof surface toward a rear of the vehicle.

5. A vehicle rear spoiler device according to claim 1, wherein one end of the guide portion reaches the vehicle rear edge of the wall surface.

6. A vehicle rear spoiler device according to claim 1, wherein the one end portion of the guide portion is positioned apart in the vehicle width direction by a predetermined distance from a central portion in the vehicle width direction of the wall surface.

7. A vehicle rear spoiler device according to claim 1, wherein the guide portion is inclined in the vehicle front-and-rear direction with respect to the vehicle width direction in a manner that the guide portion is directed toward an outside from the central portion in the vehicle width direction along a direction toward the rear of the vehicle.

8. A vehicle rear spoiler device according to claim 1, wherein the guide portion comprises another end portion that extends up to the vehicle rear edge of the inner surface.

9. A vehicle rear spoiler device according to claim 1, wherein the position of the one end portion of the guide portion is spaced apart in the vehicle width direction from the central portion in the vehicle width direction of the wall surface by a length of $1/10$ or more of a length in the vehicle width direction of a rear window glass.

* * * * *